United States Patent Office 3,000,908
Patented Sept. 19, 1961

3,000,908
CATALYSIS OF THE VAPOR PHASE PARTIAL OXIDATION OF NAPHTHALENE TO PHTHALIC ANHYDRIDE
Robert F. Ruthruff, 18530 Klimm Ave., Homewood, Ill.
No Drawing. Filed Aug. 7, 1959, Ser. No. 832,138
10 Claims. (Cl. 260—346.4)

This invention relates to a new and improved vapor phase oxidation catalyst. More particularly, this invention relates to a new and improved catalyst for the partial oxidation of hydrocarbons in the vapor phase. In one specific aspect thereof, this invention relates to a new and improved catalyst for the vapor phase oxidation of naphthalene to phthalic anhydride. In another specific aspect thereof this invention relates to a new and improved catalyst for the vapor phase oxidation of o-xylene to phthalic anhydride.

During the period roughly embracing the interval between the two world wars, a process for the production of phthalic anhydride by the vapor phase partial oxidation of naphthalene with air in the presence of a vanadium pentoxide catalyst on an inert support was commercialized and became highly important. The catalyst employed in this process consists of about 10% vanadium pentoxide on an inert support, such materials as pumice, sand, alumina, Carborundum and aluminum turnings being used as a support; Tabular Alundum, Grade T-71, being very suitable for such use. A charge comprising a mixture of naphthalene vapors and air is passed over the catalyst which is confined in small tubes surrounded by a suitable medium for removal of heat evolved by the partial oxidation reaction. In most commercial units the charge consists of about 25 to 30 pounds of air per pound of naphthalene, roughly five times theory. This large excess of air is employed principally to provide a charge outside the explosive limits of the mixture on the lean side. Because of the highly exothermic nature of the partial oxidation reaction it is not possible to maintain even an approximately constant reaction temperature in spite of the fact that small catalyst tubes (presenting a large exterior heat transfer surface per unit volume of catalyst) are employed. Typically, the preheated air-naphthalene charge may be at say 430° C. (806° F.) when it first meets the catalyst, the greater part of the reaction occurs at about 475° C. (887° F.) and the reaction products leave the catalyst tubes at about 400° C. (752° F.)

As is to be expected, coal tar naphthalene contains appreciable amounts of sulfur compounds, the sulfur content of the material depending upon such factors as the nature of the coal processed, the carbonization temperatures employed and the method and extent of recovery of naphthalene from the tar and the method and extent of any purification procedures applied to the recovered material. Indicative of sulfur contents commonly encountered, 78° C. (172.4° F.) solidification point (SP) naphthalene samples may exhibit sulfur contents in the approximate range 0.30 to 0.55% by weight, substantially all of this sulfur being due to the presence of thianaphthene ($C_8H_6S$) as an impurity. (Naphthalene of the solidification point set forth is conventionally employed as charge in phthalic anhydride units.)

Taking a sulfur content of 0.4% as typical, and assuming that all this sulfur is converted to sulfur dioxide during the partial oxidation of such a naphthalene to phthalic anhydride, then at a 30:1 weight ratio of air to naphthalene the gaseous reaction products will contain only about 0.01 volume percent sulfur dioxide. Supported vanadium pentoxide is quite ineffective as a catalyst for the oxidation of sulfur dioxide to sulfur trioxide so there is very little if any sulfur trioxide in the gaseous reaction products.

A new and greatly improved catalyst for the partial oxidation of naphthalene to phthalic anhydride was developed in Germany about 1935. Soon after the conclusion of World War II, directions for the preparation of this catalyst became available through a number of reports covering post-war investigations of German technical developments. Directions for the preparation of this catalyst may be found, for example, in:

B.I.O.S. Final Report No. 1597, Item No. 22, pages 31–32.
B.I.O.S Final Report No 1597, Item No 22, Appendix II.
F.I.A.T. Final Report No. 649.
B.I.O.S. Report No. 935.
B.I.O.S. Report No. 753.

While directions given in these several reports for preparing the German catalyst are not completely consistent with respect to certain details, they all show that this catalyst is prepared by the series of broad steps listed below:

A. A silica hydrogel is formed by the interaction of a dilute potassium silicate solution and dilute sulfuric acid.

B. The hydrogel formed in (A) is filtered but is not washed. As is well known, following filtration, a silica hydrogel still holds a considerable proportion of water (i.e., mother liquor). Accordingly, here where the filter cake is not washed, this cake consists of hydrated silica and mechanically retained potassium sulfate solution.

C. The filtered but unwashed hydrogel is dried and the resulting product is impregnated with the proper proportion of vanadium compound applied in the form of an aqueous vanadyl sulfate solution.

D. The impregnated product of (C) is formed as necessary, dried, and finally calcined to produce the final catalyst.

In comparison with the previously described supported vanadium pentoxide catalysts of the prior art, this German catalyst is characterized by a remarkedly enhanced activity and selectivity. Using a fixed catalyst bed and an air to naphthalene ratio of about 30:1 by weight, a reaction temperature of only about 370° C. (698° F.) is employed with the German catalyst which is to be compared with the much higher temperatures required when the catalyst of the prior art is used. Also, with the German catalyst the yield of market grade phthalic anhydride is 95–100 pounds per 100 pounds naphthalene charge; using the conventional supported vanadium pentoxide catalyst the yield, similarly expressed, seldom exceeds 80 pounds. It should be pointed out that for maximum product yield the German catalyst requires a much longer contact time than the supported vanadium pentoxide catalyst of the prior art which fact, in some measure at least, compensates for the very low operating temperature employed with the German catalyst.

In contrast to the prior art supported vanadium pentoxide catalyst, the German catalyst is extremely effective in converting sulfur dioxide to sulfur trioxide. However, under certain operating conditions oxidation of sulfur dioxide results in the more or less rapid conversion of the pentavalent vanadium catalyst to vanadyl sulfate which exhibits low catalytic activity:

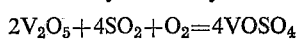

The presence of potassium sulfate in the German catalyst tends to maintain the vanadium content thereof in the active, pentavalent state, this stabilizing action of the potassium sulfate being especially pronounced at high operating temperatures and when the reaction mixture exhibits a low partial pressure of reducing substances. As previously mentioned, an operating temperature of only 370° C. (698° F.) is employed in the German process for the partial oxidation of naphthalene. At this low temperature the stabilizing activity of the potassium sulfate is only slight. However, the German fixed bed process employs an air to naphthalene ratio of about 30:1 by weight and as a result the partial pressures of naphthalene (for example) and of sulfur dioxide (from decomposition of the thianaphthene, et cetera, present in the naphthalene as an impurity) are so low that the catalyst exists in the active pentavalent state of oxidation.

In contrast, when operating in accordance with the fluidized catalyst technique, the individual catalyst particles are separated by interstitial spaces of non-explosive dimensions and the extensive surfaces presented rapidly terminate explosion chains, thereby preventing the propagation of explosion waves through the reactor. Because of these inherent safety features it is conventional practice to charge air-naphthalene mixtures well within the explosive range to fluidized catalyst reactors. Thus, in the production of phthalic anhydride by the fluidized catalyst technique it is conventional to employ an air to naphthalene weight ratio of 15 to 1 or even lower, say 12.5 to 1 or even 10 to 1. However, the operating temperature is again low, for example, 370° C. (698° F.). This low operating temperature, in combination with a comparatively high partial pressure of reducing agents (e.g., naphthalene and sulfur dioxide) in the reactor, results in the gradual reduction of the catalyst to the tetravalent state which exhibits low catalytic activity.

Accordingly, when operating under the conditions set forth in the preceding paragraph it is necessary to halt the flow of naphthalene to the reactor periodically and restore the catalyst to the active pentavalent state of oxidation by treating it for an appreciable period with straight air, preferably at a temperature somewhat above that employed in the processing of naphthalene.

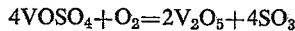

$$4VOSO_4 + O_2 = 2V_2O_5 + 4SO_3$$

Obviously, the frequent interruption of the naphthalene feed to the reactor followed by a protracted period devoted to catalyst regeneration noticeably reduces the productive capacity of the unit over that attainable if it were possible to charge naphthalene continuously. Also, the frequent necessity for taking the unit off stream and then, after catalyst regeneration, bringing it on stream again represents an operating procedure that is far from ideal. Furthermore, conditions are not constant throughout a single operating cycle for during this period the activity of the catalyst is continuously declining. If attempts are not made to compensate for the declining catalyst activity then the productive capacity of the unit and/or product purity suffer. On the other hand, attempts to conpensate for declining catalyst activity during a single operating cycle (e.g., by increasing the reaction temperature, decreasing the charging rate (i.e., increasing contact time) and the like) require more or less continuous changes in the operating conditions and/or results in reduced productive capacity.

One object of this invention is to provide a partial oxidation catalyst exhibiting a high and constant activity during use.

Another object of this invention is to provide a catalyst for the conversion of sulfur containing naphthalene to phthalic anhydride that exhibits a high and constant activity during use.

An additional object of this invention is to provide a catalyst for the low temperature conversion of a sulfur containing naphthalene charge to phthalic anhydride that exhibits a high and constant activity during use.

A further object of this invention is to provide a catalyst exhibiting a high and constant activity during use in the conversion to phthalic anhydride of a sulfur containing naphthalene and a relatively low proportion of air.

Yet another object of this invention is to provide a catalyst exhibiting a high and constant activity during use in the low temperature conversion to phthalic anhydride of a mixture containing a relatively high proportion of a sulfur containing naphthalene and a relatively low proportion of air.

Other objects of this invention will become apparent as the description thereof proceeds.

I have discovered that replacement of from about 10 mole percent to about 35 mole percent of the potassium oxide content of the German catalyst with the stoichiometrically equivalent amount of one or more oxides of an alkali metal having a higher atomic weight than potassium (e.g., rubidium, cesium) results in a catalyst that retains its initial high activity for protracted periods when employed to accelerate the partial oxidation of sulfur contaminated naphthalene at low temperatures and at low air:naphthalene ratios. For convenience in exposition, alkali metal oxides of the nature of rubidium oxide and cesium oxide will be referred to herein as "higher alkali metal oxides."

It is emphasized that the objects of this invention are accomplished only if there is a partial replacement, within the approximate limits previously set forth, of the potassium oxide content of the catalyst with a higher alkali metal oxide. It is a surprising fact that complete replacement of the potassium oxide content of the German catalyst by either rubidium oxide or cesium oxide results in catalysts scarcely to be distinguished from the German catalyst itself.

It is further emphasized that the objects of this invention are not accomplished by the partial replacement, within the approximate limits previously set forth, of the potassium oxide content of the German catalyst with one or more oxides of an alkali metal of lower atomic weight than potassium (i.e., sodium, lithium). At best, catalysts modified in this way are no better than the German catalyst itself and if potassium oxide replacement is appreciably greater than the lower limit of the approximate range previously given the resulting catalysts are distinctly inferior to the German catalyst. As would be expected from this, complete replacement of the potassium oxide content of the German catalyst by either sodium oxide or lithium oxide results in catalysts distinctly inferior to the German catalyst both in activity and stability.

The new and improved catalysts of this invention may be prepared by suitable modifications of the German preparative procedure previously briefly outlined herein. Thus, a potassium-higher alkali metal silicate suitable for use in the preparation of the improved catalyst of this invention may be prepared by fusing silica with a mixture of potassium carbonate and one or more higher alkali metal carbonates in a ratio falling within the approximate range previously given. However, this requires the production of a very special alkali metal silicate, useful only in the preparation of the improved catalyst of this invention.

Or, essentially similar results may be obtained using a potassium silicate solution to which the appropriate amount of higher alkali metal hydroxide (e.g., rubidium hydroxide) has been added. However, higher alkali metal hydroxides are very expensive and are not efficiently utilized in the German preparative procedure. As will be seen from paragraph B of the description of the procedure followed in preparing the German catalyst, the silica hydrogel is filtered. Even though the filtered hydrogel is not washed it is evident that in the German process modified as just described to provide the improved catalysts of this invention, a considerable proportion of the very expensive higher alkali metal hydroxide used will be lost in the filtrate in the form of higher alkali metal sulfate.

The new and improved catalysts of this invention may be conveniently and economically prepared by impregnating a suitable carrier, for example, prepared by impregnating a preformed silica gel with a solution of vanadium pentoxide in a mixture of suitable compounds derived from potassium oxide and one or more higher alkali metal oxides, said mixture falling in the approximate ratio range previously given. If desired, this mixture of suitable compounds derived from potassium oxide and one or more higher alkali metal oxides may be prepared by mixing the pure, individual compounds in the ratios required to form a mixture within the approximate range previously given. However, the material marketed by American Potash and Chemical Corporation under the trademark Alkarb is a mixture of potassium carbonate and higher alkali metal carbonates falling in this required ratio range. A typical analysis of Alkarb is set forth below:

|  | Percent |
|---|---|
| Potassium carbonate | 70.4 |
| Rubidium carbonate | 23.1 |
| Cesium carbonate | 2.2 |
| Sodium carbonate | 2.9 |
| Lithium carbonate | 1.1 |
| Miscl. minor compounds | 0.4817 |
| Total | 100.1817 |

As may readily be determined by calculation, the higher alkali metal carbonates in the above mixture represent about 17.5 mole percent of the total of potassium carbonate plus higher alkali metal carbonates. Also, the mixture contains only small amounts of the undesirable sodium carbonate and lithium carbonate. This mixture, which is almost ideal for the purposes of this invention, is not burdened by the high costs involved in the separation of potassium carbonate and of rubidium carbonate in pure form (which pure salts would be separated only to be mixed again in preparing the catalysts of this invention). Accordingly, this mixture represents a highly economic source of higher alkali metal carbonates and, in fact, of potassium carbonate itself since Alkarb sells at a lower price than pure potassium carbonate.

The proportions in which the various ingredients are employed in forming the improved catalysts of this invention are not too critical. In general, from about two moles to about three moles total alkali metal oxides (potassium oxide plus higher alkali metal oxides) are employed per mole vanadium pentoxide. The alkali metal oxide-sulfur trioxide compound acts as a solvent for the vanadium pentoxide and there is not need to employ more solvent than is necessary to give complete solution of the vanadium pentoxide in a reasonably short time. The range of mole ratios given satisfies this requirement but obviously much higher proportions of the alkali metal oxides-sulfur trioxide compound may be used if desired.

Conventionally, catalysts of this type contain from about 8% by weight to about 12% by weight vanadium pentoxide but much lower amounts, down to say 2% by weight vanadium pentoxide, may be used if desired. Also, increasing the amount of vanadium pentoxide in the catalyst to above say 12% by weight does no harm but appreciable increases in vanadium pentoxide content results in a considerable increase in catalyst cost.

For the better understanding of this invention the following illustrative but non-limiting specific examples are given.

Example 1

Technical ammonium metavanadate is dissolved in hot water and the resulting solution is filtered to remove any insoluble material in the technical product. The resulting filtrate is treated with dilute nitric acid to precipitate vanadium pentoxide ("red oxide") which is separated by filtration and washed with cold water. The washed precipitate is dried and analyzed and is employed as a source of vanadium pentoxide in the catalyst preparative procedures set forth in certain of the following examples.

Example 2

To a dilute aqueous solution containing about 20% by weight sulfuric acid there was added, slowly and with agitation, 407 parts by weight Alkarb of the characteristics previously given herein. This dilute sulfuric acid solution contained 525 parts by weight sulfuric acid (100% basis) and was held in a glass lined vessel. When all the mixed alkali metal carbonates had been added, the resulting solution was slowly heated to a gentle boil and sufficient water was evaporated therefrom to give a solution that was practically saturated.

The resulting concentrated solution was transferred to a silica pot and heating was continued to complete the removal of free water. On further gentle heating combined water is eliminated with moderate effervescence and finally the resulting quiet fusion is further heated to incipient fuming or a temperature in the neighborhood of 350–375° C. (662–707° F.).

There is slowly added to the resulting fusion 182 parts by weight vanadium pentoxide, purified as described in Example 1. During this addition sufficient heat is supplied to maintain fluid conditions. Dissolution of the vanadium pentoxide is promoted by gentle stirring.

The dark brown solution of vanadium pentoxide, prepared as above described, is distributed, as uniformly as possible, over 919 parts by weight silica gel. For subsequent employment of the final catalyst in accordance with the fluidized solids technique this silica gel must be finely divided, preferably having a particle size in the range 10 to 100 microns. Microspheroidal silica gel, widely employed as a support in the preparation of catalysts for certain petroleum refining operations, conducted in accordance with the fluidized catalyst technique, is particularly suitable for use as a support in the preparation of the catalysts of the present invention. In the present instance the above quantity of a microspheroidal silica gel was charged to a steam heated sigma mixer. The mixer was placed in operation and after the silica gel had been heated the above prepared vanadium pentoxide solution was slowly poured onto the moving mass of silica gel particles. After addition was complete the catalyst was finished by calcining at a temperature of 425–450° C. (797–842° F.) for a period of four to six hours, the catalyst being rabbled at frequent intervals during the calcining operation.

Batches of catalyst prepared in accordance with the directions of this example have analyses averaging about as follows:

|  | Percent |
|---|---|
| Vanadium pentoxide | 10 |
| $SO_3$ | 23 |
| Silica | 51 |
| $M_2O$ (by difference) | 16 |

Where M designates an alkali metal.

Example 3

The activity of a catalyst prepared in accordance with Example 2 was determined, using a laboratory fluidized catalyst unit particularly designed for such purposes. A mixture of air and vaporized 78° C. (172.4° F.) S.P. naphthalene (0.38% sulfur) in a 12.5:1 weight ratio was passed upward through a column of the catalyst at the rate necessary to give a superficial linear velocity of one foot per second. (Volume occupied by the catalyst is neglected in calculating superficial linear velocity.) The contact time, based on the superficial linear velocity, was a little over 12 seconds. A catalyst temperature of 370° C. (698° F.) was employed.

Throughout an extended reaction period the yield of crude phthalic anhydride ranged from 99 to 103 parts by weight per 100 parts by weight naphthalene charged. While phthalic anhydride yield varied somewhat during successive portions of the total on stream period (as is to be expected in small scale experimental work of this kind) no consistent downward trend in catalyst activity could be observed.

From time to time during the course of this experiment a small sample of catalyst was withdrawn from the reactor and the reduced vanadium content thereof was determined. Catalyst withdrawal was accomplished as follows:

The cock in a valved line leading from the fluidized catalyst reactor was opened and a stream of carbon dioxide was blown therethrough momentarily to clear the sample line of any catalyst that had collected therein. Then passage of carbon dioxide through this line and into the reactor was stopped and a small sample of catalyst, representative of that in the catalyst bed, was withdrawn from the catalyst bed through this sample line and discharged into a vertical glass tube through which a slow stream of carbon dioxide was passing. The valve in the sample line was then closed. Carbon dioxide was passed through the withdrawn sample of catalyst until the latter had been cooled almost to room temperature. When the sample of catalyst had cooled it was dropped into dilute sulfuric acid through which a slow stream of carbon dioxide was passing. The catalyst sample was leached with this dilute sulfuric acid at steam bath temperature for about one hour with occasional swirling to extract all soluble material. Passage of a slow stream of carbon dioxide through the dilute acid continued during this leaching period.

An aliquot of known volume of the resulting solution was removed and titrated in accordance with conventional analytical practices with standard potassium permanganate solution to obtain a measure of the amount of reduced vanadium in the catalyst.

A second aliquot of known volume of the resulting solution was removed and treated with a stream of sulfur dioxide at a temperature of 70° C. (158° F.) or somewhat higher until reduction of all vanadium to vanadyl sulfate was complete. At this point passage of sulfur dioxide was stopped and sulfur dioxide remaining in the reduced solution was removed by passing a stream of carbon dioxide therethrough. Total vanadium was then determined by titration as before.

Obviously, from the results of these two analytical determinations, it is possible to calculate the proportion of reduced vanadium in the catalyst. A plot of the so determined proportion of reduced vanadium versus on-stream time indicated that at equilibrium only approximately 15% of the vanadium in the catalyst was in reduced form.

For comparison, a similar life test was run on a catalyst made using pure potassium carbonate but having approximately the same molar concentrations of ingredients as the catalyst of Example 2. Initially the activity of this straight $K_2O$ catalyst was the same as that of the catalyst of Example 2, the yield of crude phthalic anhydride being, at first, a little more than 100 parts by weight per 100 parts by weight naphthalene charged. However, the phthalic anhydride yield gradually decreased with increasing time on stream until finally only around 85 parts by weight crude phthalic anhydride were being obtained per 100 parts by weight naphthalene charged. At equilibrium about 50% of the vanadium content of the catalyst was found to be in reduced form.

Finally, a life test was run on a catalyst made using pure rubidium carbonate but having approximately the same molar composition as the catalyst of Example 2. Initially the activity of this straight $Rb_2O$ catalyst was the same as that of the catalyst of Example 2 but the phthalic anhydride yield gradually decreased with time on stream to about 89 to 91 parts crude phthalic anhydride per 100 parts naphthalene charged. At equilibrium about 30% of the vanadium of this catalyst was in reduced form.

*Example 4*

The procedure employed to form the catalyst of this example was similar to that described in detail in Example 2 but the weights of certain of the reactants differed as set forth below:

Four hundred and twenty parts by weight of 100% sulfuric acid (as a 20% solution) were employed to dissolve only 326 parts by weight Alkarb. The amount of vanadium pentoxide (purified as described in Example 1) employed here was the same as that set forth in Example 1 but 1062 parts by weight silica gel were employed as a support.

The final calcined catalyst of the present example had the following analysis:

| | Percent |
|---|---|
| Vanadium pentoxide | 10 |
| $SO_3$ | 19 |
| Silica | 58 |
| $M_2O$ (by difference) | 13 |

*Example 5*

The procedure employed to form the catalyst of this example was similar to that described in detail in Example 2 but the weights of certain of the reactants differed as set forth below:

Six hundred and thirty parts by weight of 100% sulfuric acid (as a 20% solution) were employed to dissolve 488 parts by weight Alkarb. One hundred and eighty two parts by weight vanadium pentoxide (purified as described in Example 1) were used together with 776 parts by weight of a silica gel support.

The final calcined catalyst of the present example had the following analysis:

| | Percent |
|---|---|
| Vanadium pentoxide | 10 |
| $SO_3$ | 28 |
| Silica | 43 |
| $M_2O$ (by difference) | 19 |

Individual life and activity tests were run using, respectively, the catalyst of Example 4 and the catalyst of Example 5 and employing the methods and means previously set forth in Example 3 hereof.

The catalysts of Example 4 and of Example 5 cannot be distinguished from that of Example 2 with respect to phthalic anhydride yield versus time on stream characteristics or with respect to reduced vanadium content at equilibrium.

While the catalysts of Examples 2, 4 and 5 all have a constant vanadium pentoxide content of 10%, as has been mentioned previously catalysts in accordance with this invention may be prepared in which the vanadium pentoxide content varies over a considerable range. The vanadium pentoxide content of the catalyst may be set at any predetermined figure by changes in the amount of silica gel support employed.

While the catalysts of Examples 2, 4 and 5 all were prepared using an alkali metal carbonate mixture containing about 82.5 mole percent potassium carbonate and about 17.5 mole percent higher alkali metal carbonates (mostly rubidium carbonate), it will be evident from the previous discussion that this particular composition was selected solely because of the ready availability of an alkali metal carbonate mixture of this ratio of potassium oxide to higher alkali metal oxides. As previously pointed out, the ratio of potassium oxide to higher alkali metal oxides may vary over a considerable range in preparing catalysts in accordance with this invention.

Also, while the higher alkali metal carbonate in the mixed alkali metal carbonates here employed is essentially rubidium carbonate, catalysts may be prepared in accordance with this invention using a mixture of alkali metal carbonates containing from about 65 to about 90 mole percent potassium carbonate and, correspondingly, 35 to 10 mole percent cesium carbonate. However, cesium compounds are so rare and expensive that it would not be economically feasible to prepare catalysts using such a mixture.

It should be understood that the silica gel employed in the preparation of the catalysts of Examples 2, 4, and 5 is merely an inert, porous support for the respective vanadium pentoxide solutions prepared as described in detail in Example 2. Any other inert and, preferably, porous support may be used if desired. However, it should be emphasized that such a support must be inert to strongly acidic conditions, even at elevated temperatures.

The use of the catalysts of this invention for the production of phthalic anhydride has been described in connection with the partial oxidation of naphthalene at a reaction temperature of 370° C. (698° F.) and in accordance with the fluidized catalyst technique.

It is obviously not essential that the partial oxidation reaction be conducted at a temperature exactly or even approximately 370° C. (698° F.). As is well known to those skilled in the catalytic conversion art, temperature and contact time are inversely but mutually interchangeable over a rather considerable range. In the present instance for example, essentially similar results are obtained at a temperature as low as about 320° C. (608° F.) with considerably increased contact time or at a temperature as high as about 420° C. (788° F.) with diminished contact time. However, all points of view taken into consideration, an operating temperature of about 370° C. (698° F.) is preferred.

It is not essential that the improved catalysts of this invention be employed in accordance with the fluidized solids technique. If desired, the catalysts of this invention may be charged to fixed catalyst bed units. However, for fixed bed use it is necessary that individual catalyst particles of appreciable size (e.g., of 4 to 8 mesh) be used. This requires either that the catalyst support employed be of the required appreciable size or that a finely divided catalyst prepared as previously described be formed into pellets of the appreciable size required for fixed bed operations. For reasons previously given, fixed bed operations are conventionally conducted at a high air:naphthalene ratio. Obviously, employing the catalysts of this invention under such conditions does not result in the realization of the advantages of this invention to the fullest possible extent. However, in some fixed bed installations, a low air to naphthalene ratio is employed in spite of the accompanying danger of fires and explosions and in such instances the advantages of the improved catalysts of this invention are fully realized.

While this invention has been described in connection with the production of phthalic anhydride by the partial oxidation of naphthalene it is not limited thereto. Phthalic anhydride may be prepared by the partial oxidation of a number of coal tar products and fractions in the presence of the improved catalysts of this invention. Exemplifying such other charging stocks may be mentioned alpha and beta methyl naphthalenes, indene, anthracene, naphthalene oil fom coal tar (e.g., the fraction boiling in the range 200–230° C. (392–455° F.)) and a coal tar fraction rich in methyl naphthalenes (e.g., a fraction boiling in the range 235–270° C. (455–518° F.)).

As would be expected, o-xylene may be converted to phthalic anhydride by partial oxidation in the presence of the improved catalysts of this invention but the advantages of the catalysts of this invention are not realized to the greatest possible extent when using o-xylene from petroleum sources due to the low sulfur content thereof. However, with coal tar derived o-xylene as a charging stock the advantages of the catalysts of this invention are fully realized.

Be it remembered, that while this invention has been descibed in connection with specific details and specific embodiments thereof, these details and embodiments are illustrative only and are not to be considered limitations on the spirit and scope of said invention except in so far as these may be incorporated in the appended claims.

I claim:

1. A process for the vapor phase catalytic oxidation of naphthalene to phthalic anhydride which comprises passing air containing from about 0.75 to about 2.25 mole percent naphthalene vapors into contact with a catalyst maintained in the approximate temperature range 320° C. to 420° C., said catalyst being a solution, distributed on silica gel, of vanadium pentoxide in a mixture of alkali metal salts of pyrosulfuric acid, the alkali metal portion of said mixture of salts comprising from about 65 to about 90 mole percent potassium and from about 35 to about 10 mole percent of at least one alkali metal selected from the group consisting of rubidium and cesium.

2. The process of claim 1, further characterized by the fact that said mixture of alkali metal salts consists at least essentially of potassium salts and rubidium salts of pyrosulfuric acid.

3. A process for the vapor phase catalytic oxidation of naphthalene to phthalic anhydride which comprises passing air containing in the neighborhood of 1.5 mole percent naphthalene vapors into contact with a catalyst maintained at a temperature of approximately 370° C., said catalyst being a solution, distributed on silica gel, of vanadium pentoxide in a mixture of alkali metal salts of pyrosulfuric acids, the alkali metal portion of said mixture of salts comprising from about 65 to about 90 mole percent potassium and from about 35 to about 10 mole percent of at least one alkali metal selected from the group consisting of rubidium and cesium.

4. The process of claim 3, further characterized by the fact that said mixture of alkali metal salts consists at least essentially of potassium salts and rubidium salts of pyrosulfuric acid.

5. A process for the vapor phase catalytic oxidation of naphthalene to phthalic anhydride which comprises passing air containing in the neighborhood of 1.5 mole percent naphthalene vapors into contact with a catalyst consisting of a solution, distributed on silica gel, of one molecular equivalent of vanadium pentoxide in from about two to about three molecular equivalents of a mixture of alkali metal salts of pyrosulfuric acid, the alkali metal portion of said mixture of salts comprising from about 65 to about 90 mole percent potassium and from about 35 to about 10 mole percent of at least one alkali metal selected from the group consisting of rubidium and cesium.

6. The process of claim 5, further characterized by the fact that said mixture of alkali metal salts consists at least essentially of potassium salts and rubidium salts of pyrosulfuric acid.

7. A process for the vapor phase catalytic oxidation of naphthalene to phthalic anhydride which comprises passing air containing in the neighborhood of 1.5 mole percent naphthalene vapors into contact with a catalyst consisting of a solution, distributed on silica gel, of one molecular equivalent of vanadium pentoxide in from about two to about three molecular equivalents of a mixture of alkali metal salts of pyrosulfuric acid, the alkali metal portion of said mixture of salts comprising from about 65 to about 90 mole percent potassium and from about 35 to about 10 mole percent of at least one alkali metal selected from the group consisting of rubidium and cesium, the vanadium pentoxide content of said catalyst being from about 8 to about 12 percent by weight.

8. The process of claim 7, further characterized by the fact that said process is conducted in accordance with the fluidized solids technique.

9. The process of claim 7, further characterized by the fact that said mixture of alkali metal salts consists at least essentially of potassium salts and rubidium salts of pyrosulfuric acid.

10. The process of claim 9, further characterized by the fact that said process is conducted in accordance with the fluidized solids technique.

References Cited in the file of this patent

UNITED STATES PATENTS

| | | |
|---|---|---|
| 1,764,023 | Jaeger | June 17, 1930 |
| 1,809,752 | Jaeger | June 9, 1931 |
| 1,909,354 | Jaeger | May 15, 1933 |